United States Patent
Matsumaru et al.

(10) Patent No.: US 11,421,079 B2
(45) Date of Patent: Aug. 23, 2022

(54) METHOD FOR CONTROLLING POLYIMIDE BACKBONE STRUCTURE AND METHOD FOR PRODUCING POLYIMIDE

(71) Applicant: MITSUBISHI GAS CHEMICAL COMPANY, INC., Tokyo (JP)

(72) Inventors: Teruhisa Matsumaru, Kanagawa (JP); Yohei Abiko, Kanagawa (JP); Shuya Suenaga, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 43 days.

(21) Appl. No.: 16/083,099

(22) PCT Filed: Feb. 24, 2017

(86) PCT No.: PCT/JP2017/007183
§ 371 (c)(1),
(2) Date: Sep. 7, 2018

(87) PCT Pub. No.: WO2017/159298
PCT Pub. Date: Sep. 21, 2017

(65) Prior Publication Data
US 2019/0100622 A1    Apr. 4, 2019

(30) Foreign Application Priority Data
Mar. 14, 2016 (JP) .............................. JP2016-049532

(51) Int. Cl.
*C08G 73/10* (2006.01)

(52) U.S. Cl.
CPC ..... *C08G 73/1032* (2013.01); *C08G 73/1039* (2013.01); *C08G 73/1042* (2013.01); *C08G 73/1078* (2013.01)

(58) Field of Classification Search
None
See application file for complete search history.

(56) References Cited

U.S. PATENT DOCUMENTS

2004/0266979 A1* 12/2004 Oguro ............... C08G 73/1028
528/336
2008/0020217 A1   1/2008 Makinoshima et al.
2009/0068482 A1*  3/2009 Bito .................... B32B 7/12
428/473.5
2015/0225523 A1   8/2015 Suenaga et al.
2016/0137789 A1*  5/2016 Suenaga ............... B32B 27/08
428/220

FOREIGN PATENT DOCUMENTS

| JP | 2006-37079 A | 2/2006 |
| JP | 2009-286706 A | 12/2009 |
| JP | 2009286706 A * | 12/2009 |
| JP | 2012251080 A * | 12/2012 |
| JP | 2013-184943 A | 9/2013 |
| WO | WO-2015002273 A1 * | 1/2015 ............. B32B 27/08 |

OTHER PUBLICATIONS

Hasegawa et al (Solution-processable colorless polyimides derived from hydrogenated pyromellitic dianhydride with controlled steric structure. Journal of Polymer Science Part A: Polymer Chemistry, 51(3), 575-592, 2013). (Year: 2013).*
International Search Report in International Patent Application No. PCT/JP2017/007183, dated Apr. 11, 2017.
International Preliminary Report on Patentability in International Patent Application No. PCT/JP2017/007183, dated.
Supplementary European Search Report (EESR) in EP 17 76 6303 dated Jan. 24, 2019.

* cited by examiner

*Primary Examiner* — Rachel Kahn
(74) *Attorney, Agent, or Firm* — Greenblum & Bernstein, P.L.C.

(57) ABSTRACT

A method for controlling a polyimide backbone structure, including: in preparation of a polyimide through reaction of a diamine component and (1S,2R,4S,5R)-cyclohexanetetracarboxylic dianhydride in an organic solvent containing an aprotic amide solvent and a lactone solvent, adjusting one or more of reaction conditions of a mass ratio of the aprotic amide solvent and the lactone solvent, a reaction temperature, a reaction time, and an amount of the aprotic amide solvent, so as to convert a cis-structure derived from the (1S,2R,4S,5R)-cyclohexanetetracarboxylic dianhydride in the formed polyimide to a trans-structure derived from (1R,2S,4S,5R)-cyclohexanetetracarboxylic dianhydride corresponding to the reaction conditions, thereby controlling a proportion of the trans-structure.

6 Claims, No Drawings

METHOD FOR CONTROLLING POLYIMIDE BACKBONE STRUCTURE AND METHOD FOR PRODUCING POLYIMIDE

TECHNICAL FIELD

The present invention relates to a method for controlling a polyimide backbone structure and a method for producing a polyimide.

BACKGROUND ART

A polyimide having characteristics including a sufficient film toughness, a low dielectric constant, and a high glass transition temperature has been widely applied to a liquid crystal orientation film, an electric insulation film for various electric devices, an interlayer dielectric film and a protective film for a semiconductor device, a substrate for a liquid crystal display device, a substrate for an organic electroluminescent (EL) display device, a substrate for electronic paper, a substrate for a solar cell, a substrate for an optical waveguide, a conveying belt for a heated article, a fixing belt and an intermediate transfer belt for an electrophotographic system, and the like.

One of compounds useful as a polyimide raw material is 1,2,4,5-cyclohexanetetracarboxylic dianhydride. A polyimide produced by using the compound can easily have a high transparency, a low dielectric constant, and a high toughness.

While 1,2,4,5-cyclohexanetetracarboxylic dianhydride has been obtained by various methods, (1S,2R,4S,5R)-cyclohexanetetracarboxylic dianhydride, which is a cis-isomer, represented by the following formula (A) is easily formed by any of the methods. It is considered that this is because (1S,2R,4S,5R)-cyclohexanetetracarboxylic dianhydride has the thermodynamically most stable steric stricture (see, for example, PTL 1).

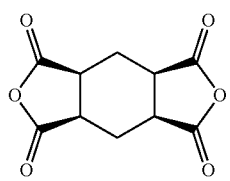

(A)

A polyimide obtained through reaction of (1S,2R,4S,5R)-cyclohexanetetracarboxylic dianhydride and a diamine eventually has a backbone structure derived from (1S,2R,4S,5R)-cyclohexanetetracarboxylic dianhydride represented by the following formula (B) (which may be referred to as a "cis-structure").

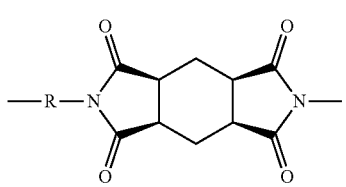

(B)

In the above formula, R represents a divalent organic group derived from the diamine component.

CITATION LIST

Patent Literature

PTL 1: JP 2009-286706 A

SUMMARY OF INVENTION

Technical Problem

A polyimide having a cis-structure has a low viscosity and thus has limitation in thickness of the film capable of being formed therewith. Specifically, a coating liquid is necessarily further diluted for forming a thin film, but the dilution rate is limited due to the low viscosity. A coating liquid is necessarily concentrated for forming a thick film, but this is not practical.

In the case where a coating liquid having a high viscosity to some extent can be obtained, on the other hand, the variation of the dilution rate can be broadened, or the coating liquid can be coated in a high viscosity state, thereby solving the aforementioned problem.

In other words, a polyimide produced by using 1,2,4,5-cyclohexanetetracarboxylic dianhydride that has a high viscosity without changing the composition and the molecular weight thereof can have a wider range of application fields thereof including thin films and thick films.

Under the circumstances, a problem to be solved by the present invention is to provide a method for producing a polyimide that is capable of preparing a polyimide having a desired viscosity of from a low viscosity to a high viscosity with the same composition and the same molecular weight, and a method for controlling a polyimide backbone structure, which is applied to the method for producing a polyimide.

Solution to Problem

The present inventors have found that the problem can be solved by a method for controlling a polyimide backbone structure including, in preparation of a polyimide through reaction of a diamine component and (1S,2R,4S,5R)-cyclohexanetetracarboxylic dianhydride, which is a cis-isomer, in an organic solvent containing an aprotic amide solvent and a lactone solvent, adjusting one or more reaction conditions of a mass ratio of the aprotic amide solvent and the lactone solvent, a reaction temperature, a reaction time, and an amount of the aprotic amide solvent, and thus the present invention has been completed.

The present invention relates to the following items [1] to [4].

[1] A method for controlling a polyimide backbone structure, including:

in preparation of a polyimide through reaction of a diamine component and (1S,2R,4S,5R)-cyclohexanetetracarboxylic dianhydride in an organic solvent containing an aprotic amide solvent and a lactone solvent, adjusting one or more of reaction conditions of a mass ratio of the aprotic amide solvent and the lactone solvent, a reaction temperature, a reaction time, and an amount of the aprotic amide solvent, so as to convert a cis-structure derived from the (1S,2R,4S,5R)-cyclohexanetetracarboxylic dianhydride in the formed polyimide to a trans-structure derived from (1R,2S,4S,5R)-cyclohexanetetracarboxylic dianhydride corresponding to the reaction conditions, thereby controlling a proportion of the trans-structure.

[2] The method for controlling a polyimide backbone structure according to the item [1], including:

adjusting the mass ratio of the aprotic amide solvent and the lactone solvent; and keeping the reaction temperature constant at 170° C. or more.

[3] A method for producing a polyamide, including:

in preparation of a polyimide through reaction of a diamine component and (1S,2R,4S,5R)-cyclohexanetetracarboxylic dianhydride in an organic solvent containing an aprotic amide solvent and a lactone solvent, adjusting one or more of reaction conditions of a mass ratio of the aprotic amide solvent and the lactone solvent, a reaction temperature, a reaction time, and an amount of the aprotic amide solvent, so as to convert a cis-structure derived from the (1S,2R,4S,5R)-cyclohexanetetracarboxylic dianhydride in the formed polyimide to a trans-structure derived from (1R,2S,4S,5R)-cyclohexanetetracarboxylic dianhydride corresponding to the reaction conditions, thereby controlling a proportion of the trans-structure.

[4] The method for producing a polyamide according to the item [3], including:

adjusting the mass ratio of the aprotic amide solvent and the lactone solvent; and keeping the reaction temperature constant at 170° C. or more.

Advantageous Effects of Invention

According to the present invention, a method for producing a polyimide that is capable of preparing a polyimide having a desired viscosity of from a low viscosity to a high viscosity with the same composition and the same molecular weight, and a method for controlling a polyimide backbone structure, which is applied to the method for producing a polyimide, can be provided

DESCRIPTION OF EMBODIMENTS

Method for Controlling Polyimide Backbone Structure

The method for controlling a polyimide backbone structure of the present invention includes, in preparation of a polyimide through reaction of a diamine component and (1S,2R,4S,5R)-cyclohexanetetracarboxylic dianhydride in an organic solvent containing an aprotic amide solvent and a lactone solvent, adjusting one or more of reaction conditions of a mass ratio of the aprotic amide solvent and the lactone solvent, a reaction temperature, a reaction time, and an amount of the aprotic amide solvent, so as to convert a cis-structure derived from the (1S,2R,4S,5R)-cyclohexanetetracarboxylic dianhydride in the formed polyimide to a trans-structure derived from (1R,2S,4S,5R)-cyclohexanetetracarboxylic dianhydride corresponding to the reaction conditions, thereby controlling a proportion of the trans-structure.

The reaction of a diamine component and (1S,2R,4S,5R)-cyclohexanetetracarboxylic dianhydride generally provides a polyimide having a cis-structure represented by the following formula (B) derived from (1S,2R,4S,5R)-cyclohexanetetracarboxylic dianhydride.

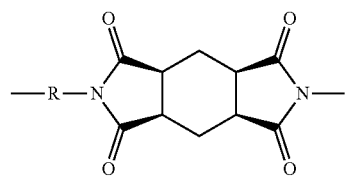
(B)

In the above formula, R represents a divalent organic group derived from the diamine component.

In the present invention, in the organic solvent containing an aprotic amide solvent and a lactone solvent, one or more of reaction conditions of the mass ratio of the aprotic amide solvent and the lactone solvent, the reaction temperature, the reaction time, and the amount of the aprotic amide solvent are adjusted so as to convert the cis-structure in the formed polyimide to the trans-structure (represented by the following formula (D)) derived from (1R,2S,4S,5R)-cyclohexanetetracarboxylic dianhydride, which is a trans-isomer, represented by the following formula (C) corresponding to the reaction conditions, and thus the proportion of the trans-structure can be controlled.

By increasing the proportion of the trans-structure, the viscosity of the polyimide can be increased corresponding thereto.

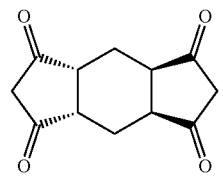
(C)

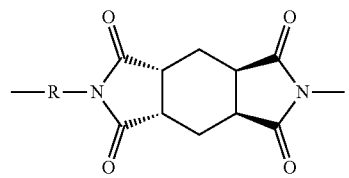
(D)

In the above formula, R represents a divalent organic group derived from the diamine component.

The mass ratio of the aprotic amide solvent and the lactone solvent ((aprotic amide solvent):(lactone solvent)) in the reaction performed is preferably kept constant within a range of from 0:100 to 80:20. The larger the proportion of the aprotic amide solvent is, the larger the proportion of the trans-structure is.

The term "constant" in the expression "kept constant within a range of from 0:100 to 80:20" herein means that the mass ratio is in a range of ±3 of a set value selected from a range of from 0:100 to 80:20. For example, in the case where the ratio (aprotic amide solvent):(lactone solvent) is set to 30:70, the mass ratio within a range of (from 27 to 33):(from 73 to 67) corresponds to the " constant".

The reaction temperature is preferably kept constant within a range of from 170 to 200° C. while depending on the boiling point of the solvent. The higher the reaction temperature is, the larger the proportion of the trans-structure is.

The term "constant" in the expression "kept constant within a range of from 170 to 200° C." herein means that the reaction temperature is in a range of ±5° C. of a set value selected from a range of from 170 to 200° C. For example, in the case where the reaction temperature is set to 180° C., the actual temperature within a range of from 175 to 185° C. corresponds to the "constant".

The reaction time is preferably kept constant within a range of from 1 to 72 hours. The longer the reaction time is, the larger the proportion of the trans-structure is.

The "reaction time" herein means a period of time where the temperature is retained within ±5° C. of the set temperature, from the reaction start time when the temperature reaches the target temperature, to the reaction end when the temperature is decreased lower by 6° C. than the set temperature after completing the reaction. The term "constant" in the expression "kept constant within a range of from 1 to 72 hours" herein means that the reaction time is in a range of ±5 minutes of a set time selected from a range of from 1 to 72 hours. For example, in the case where the reaction time is set to 3 hours, the actual reaction time within a range of from 2 hours and 55 minutes to 3 hours and 5 minutes corresponds to the "constant".

The amount of the aprotic amide solvent is preferably kept constant within a range of from 20 to 60% by mass in the organic solvent. The larger the concentration of the aprotic amide solvent in the organic solvent is, the larger the proportion of the trans-structure is.

The term "constant" in the expression "kept constant within a range of from 20 to 60% by mass in the organic solvent" herein means that the amount of the aprotic amide solvent is in a range of ±3% by mass of a set value selected from a range of from 20 to 60% by mass. For example, in the case where the amount of the aprotic amide solvent is set to 30% by mass, the amount thereof within a range of from 27 to 33% by mass corresponds to the "constant".

Among the conditions described above, it is preferable to adjust the mass ratio of the aprotic amide solvent and the lactone solvent, and keep the reaction temperature constant at 170° C. or more, from the standpoint of converting to the trans-structure efficiently.

In the present invention, the proportion of the trans-structure in the formed polyimide can be controlled by adjusting one or more of reaction conditions of the mass ratio of the aprotic amide solvent and the lactone solvent, the reaction temperature, the reaction time, and the amount of the aprotic amide solvent. From the standpoint of increasing the viscosity of the formed polyimide, it is preferable to control the reaction conditions so as to increase the proportion of the trans-structure, and specifically, it is preferable to control the proportion of the trans-structure to 10% by mol or more, more preferable to control it to 25% by mol or more, and further preferable to control it to 50% by mol or more.

From the standpoint of increasing the proportion of the trans-structure, it is preferable to keep the mass ratio of the aprotic amide solvent and the lactone solvent ((aprotic amide solvent):(lactone solvent)) constant within a range of from 10:90 to 80:20, more preferable to keep it constant within a range of from 20:80 to 80:20, and further preferable to keep it constant within a range of from 30:70 to 80:20.

From the standpoint of increasing the proportion of the trans-structure, it is preferable to keep the reaction temperature constant within a range of from 170 to 200° C., more preferable to keep it constant within a range of from 180 to 200° C., and further preferable to keep it constant within a range of from 190 to 200° C.

From the standpoint of increasing the proportion of the trans-structure, it is preferable to keep the reaction time constant within a range of from 1 to 72 hours, more preferable to keep it constant within a range of from 3 to 72 hours, and further preferable to keep it constant within a range of from 5 to 72 hours.

From the standpoint of increasing the proportion of the trans-structure, it is preferable to keep the amount of the aprotic amide solvent in the organic solvent constant within a range of from 20 to 60% by mass, more preferable to keep it constant within a range of from 25 to 60% by mass, and further preferable to keep it within a range of from 30 to 60% by mass.

The ratio of the cis-structure and the trans-structure can be obtained by the method described in the Examples section later.

Examples of the aprotic amide solvent include N,N-dimethylisobutylamide (DMIB), N,N-dimethylformamide, N,N-dimethylacetamide, N-methyl-2-pyrrolidone, N-methylcaprolactam, 1,3-dimethylimidazolidinone, and tetramethylurea.

Examples of the lactone solvent include γ-butyrolactone and γ-valerolactone.

An organic solvent other than the aprotic amide solvent and the lactone solvent suffices to be a solvent that does not inhibit the imidization reaction and dissolves the formed polyimide resin. Examples thereof include an aprotic solvent other than the amide solvent and the lactone solvent, a phenol solvent, an ether solvent, and a carbonate solvent.

Specific examples of the aprotic solvent other than the amide solvent and the lactone solvent include a phosphorus-containing amide solvent, such as hexamethylphosphoric amide and hexamethylphosphine triamide, a sulfur-containing solvent, such as dimethylsulfone, dimethylsulfoxide, and sulfolane, a ketone solvent, such as acetone, cyclohexanone, and methylcyclohexanone, an amine solvent, such as picoline and pyridine, and an ester solvent, such as (2-methoxy-1-methylethyl) acetate.

Specific examples of the phenol solvent include phenol, o-cresol, m-cresol, p-cresol, 2,3-xylenol, 2,4-xylenol, 2,5-xylenol, 2,6-xylenol, 3,4-xylenol, and 3,5-xylenol.

Specific examples of the ether solvent include 1,2-dimethoxyethane, bis(2-methoxyethyl) ether, 1,2-bis(2-methoxyethoxy)ethane, bis(2-(2-methoxyethoxy)ethyl) ether, tetrahydrofuran, and 1,4-dioxane.

Specific examples of the carbonate solvent include diethyl carbonate, methyl ethyl carbonate, ethylene carbonate, and propylene carbonate.

These solvents may be used alone or as a mixture of two or more kinds thereof.

The total content of the aprotic amide solvent and the lactone solvent in the organic solvent is preferably from 20 to 100% by mass, and more preferably from 40 to 100% by mass.

The diamine component becomes, through the reaction, the divalent organic group represented by R in the formula. The diamine component is not particularly limited, and an aromatic diamine compound having from 6 to 28 carbon atoms and an aliphatic diamine compound having from 2 to 28 carbon atoms may be used.

Examples of the aromatic diamine compound include such aromatic diamine compounds as p-phenylenediamine, m-phenylenediamine, 4,4'-diaminobiphenyl, 4,4'-diamino-2,2'-dimethylbiphenyl, 4,4'-diamino-3,3'-dimethylbiphenyl, 4,4'-diamino-2,2'-ditrifluoromethylbiphenyl, 2,2'-dimethylbenzidine, 3,3'-dimethylbenzidine, 2,2'-bis(trifluoromethyl) benzidine, 3,3'-bis(trifluoromethyl)benzidine, 4,4'-diaminodiphenyl ether, 3,4'-diaminodiphenyl ether, 4,4'-diaminodiphenylmethane, 4,4'-diaminobenzophenone, 4,4'- diaminodiphenylsulfone, 4,4'-diaminodiphenyl sulfide, 1,4-bis(4-aminophenoxy)benzene, 1,3-bis(4-aminophenoxy)benzene, 4,4'-bis(4-aminophenoxy)biphenyl, bis(4-(4-aminophenoxy)phenyl)sulfone, 2,2-bis(4-(4-aminophenoxy)phenyl)propane, 2,2-bis(4-(4-aminophenoxy)phenyl)-1,1,1,3,3,3-hexafluoropropane, bis(4-(3-aminophenoxy)phenyl)sulfone, and 9,9-bis(4-aminophenyl)fluorene.

Examples of the aliphatic diamine compound include such aliphatic diamine compounds as ethylenediamine, hexamethylenediamine, polyethylene glycol bis(3-aminopropyl) ether, polypropylene glycol bis(3-aminopropyl) ether, 1,3-bis(aminomethyl)cyclohexane, 1,4-bis(aminomethyl)cyclohexane, 4,4'-diaminodicyclohexylmethane, 3(4),8(9)-bis(aminomethyl)-tricyclo[5.2.1.0$^{2,6}$]decane, m-xylylenediamine, p-xylylenediamine, isophoronediamine, norbornanediamine, and a siloxane diamine compound.

These compounds may be used alone or as a mixture of two or more kinds thereof. Among the diamine compounds, preferred examples of the aromatic diamine compound include 4,4'-diamino-3,3'-dimethylbiphenyl, 4,4'-diamino-2,2'-ditrifluoromethylbiphenyl, 2,2'-dimethylbenzidine, 2,2'-bis(trifluoromethyl)benzidine, 4,4'-diaminodiphenyl ether, 4,4'-diaminodiphenylmethane, 1,4-bis(4-aminophenoxy)benzene, 1,3-bis(4-aminophenoxy)benzene, 4,4'-bis(4-aminophenoxy)biphenyl, 2,2-bis(4-(4-aminophenoxy)phenyl)propane, and 2,2-bis(4-(4-aminophenoxy)phenyl)-1,1,1,3,3,3-hexafluoropropane.

Preferred examples of the aliphatic diamine compound include 4,4'-diaminodicyclohexylmethane and 3(4),8(9)-bis(aminomethyyl)-tricyclo[5.2.1.0$^{2,6}$]decane.

The charged amount ratio of (1S,2R,4S,5R)-cyclohexanetetracarboxylic dianhydride and the diamine component is preferably from 0.9 to 1.1 mol of the diamine component per 1 mol of (1S,2R,4S,5R)-cyclohexanetetracarboxylic dianhydride.

An end capping agent may be used in addition to (1S,2R,4S,5R)-cyclohexanetetracarboxylic dianhydride and the diamine component. The end capping agent is preferably a monoamine compound or a dicarboxylic acid compound. The amount of the end capping agent charged is preferably from 0.0001 to 0.1 mol, and more preferably from 0.001 to 0.06 mol, per 1 mol of (1S,2R,4S,5R)-cyclohexanetetracarboxylic dianhydride. Recommended examples of the monoamine end capping agent include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, and 4-methylaniline. Among these, benzylamine and aniline are preferably used. The dicarboxylic acid end capping agent is preferably a dicarboxylic acid compound, and a part thereof may be ring-closed. Recommended examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid, and 4-cyclohexene-1,2-dicarboxylic acid. Among these, phthalic acid and phthalic anhydride are preferably used.

The operation procedure until reacting (imidization reaction) (1S,2R,4S,5R)-cyclohexanetetracarboxylic dianhydride and the diamine component is not particularly limited, and a known method may be used.

Specific examples of the reaction method include (1) a method, in which the diamine component and the organic solvent are charged in a reactor and are dissolved, and then stirred at room temperature to 80° C. depending on necessity, (1S,2R,4S,5R)-cyclohexanetetracarboxylic dianhydride is charged therein, and then the temperature is increased to perform the imidization reaction, (2) a method, in which (1S,2R,4S,5R)-cyclohexanetetracarboxylic dianhydride, the diamine component, and the organic solvent are charged in a reactor, and stirred at room temperature to 80° C., and then the temperature is increased to perform the imidization reaction, and (3) a method, in which (1S,2R,4S,5R)-cyclohexanetetracarboxylic dianhydride, the diamine component, and the organic solvent are charged in a reactor, and immediately the temperature is increased to perform the imidization reaction.

The imidization reaction is preferably performed while water formed in the production is removed with a Dean-Stark apparatus or the like. The operation performed may accelerate the imidization reaction, and the polymerization degree may be further increased.

In the imidization reaction, a known imidization catalyst may be used. Examples of the imidization catalyst include a base catalyst and an acid catalyst.

Examples of the base catalyst include an organic base catalyst, such as pyridine, quinoline, isoquinoline, α-picoline, β-picoline, 2,4-lutidine, 2,6-lutidine, trimethylamine, triethylamine, tripropylamine, tributylamine, imidazole, N,N-dimethylaniline, and N,N-diethylaniline, and an inorganic base catalyst, such as potassium hydroxide, sodium hydroxide, potassium carbonate, sodium carbonate, potassium hydrogen carbonate, and sodium hydrogen carbonate.

Examples of the acid catalyst include crotonic acid, acrylic acid, trans-3-hexenoic acid, cinnamic acid, benzoic acid, methylbenzoic acid, oxybenzoic acid, terephthalic acid, benzenesulfonic acid, p-toluenesulfonic acid, and naphthalenesulfonic acid. These imidization catalysts may be used alone or as a combination of two or more kinds thereof.

Among these, a base catalyst is preferably used, an organic base catalyst is more preferably used, and triethylamine is further preferably used, from the standpoint of the handleability.

Method for Producing Polyimide

The method for producing a polyamide, including: preparing a polyimide through reaction of a diamine component and (1S,2R,4S,5R)-cyclohexanetetracarboxylic dianhydride in an organic solvent containing an aprotic amide solvent and a lactone solvent; and in the preparing step, using the method for controlling a polyimide backbone structure of the present invention described above.

The aprotic amide solvent, the lactone solvent, the organic solvent other than these, the diamine component, and the like are as described for [Method for controlling Polyimide Backbone Structure].

As described in the method for controlling a polyimide backbone structure, it is preferable to adjust the mass ratio of the aprotic amide solvent and the lactone solvent, and keep the reaction temperature constant at 170° C. or more in the preparation of a polyimide.

The preferable proportion of the trans-structure from the standpoint of increasing the viscosity of the formed polyimide is also as described for [Method for controlling Polyimide Backbone Structure]. The preferable ranges of the mass ratio of the aprotic amide solvent and the lactone solvent, the reaction temperature, the reaction time, and the amount of the aprotic amide solvent are also as described for [Method for controlling Polyimide Backbone Structure].

The polyimide obtained by the production method of the present invention may be a polyimide composition, with which various additives are mixed in such a range that does not impair the effects of the present invention. Examples of the additive include an antioxidant, a light stabilizer, a surfactant, a flame retardant, a plasticizer, and a polymer compound other than the polyimide described above.

The polyimide obtained by the production method of the present invention and the polyimide composition containing the polyimide can have a desired viscosity of from a low viscosity to a high viscosity with the same composition and the same molecular weight, and thus can be applied not only to a thin film, but also to a thick film, such as a substrate for a liquid crystal display device, a substrate for an organic electroluminescent (EL) display device, a substrate for electronic paper, a substrate for a solar cell, a substrate for an optical waveguide, a conveying belt for a heated article, and a fixing belt and an intermediate transfer belt for an electrophotographic system.

EXAMPLES

The present invention will be described with reference to examples below. However, the present invention is not limited to the examples.

Example 1

In a 0.3 L five-neck round bottom glass flask equipped with stainless half-moon-shaped stirring blades, a nitrogen introducing tube, a Dean-Stark apparatus having a condenser tube attached thereto, a thermometer, and an glass end cap, 16.10 g (0.076 mol) of 2,2'-dimethylbenzidine (produced by Wakayama Seika Kogyo Co., Ltd.), 6.07 g (0.019 mol) of 2,2'-bis(trifluoromethyl)benzidine (produced by Wakayama Seika Kogyo Co., Ltd.), 44.10 g of γ-butyrolactone (produced by Mitsubishi Chemical Corporation), and 4.78 g of triethylamine (produced by Kanto Chemical Co., Inc.) as a catalyst were stirred at 200 rpm under a nitrogen atmosphere at a temperature in the reaction system of 70° C., so as to provide a solution. 21.25 g (0.095 mol) of (1S,2R,4S,5R)-cyclohexanetetracarboxylic dianhydride (produced by Mitsubishi Gas Chemical Co., Inc.) and 11.03 g of N,N-dimethylacetamide (produced by Mitsubishi Gas Chemical Co., Inc.) each were added at one time thereto, and the mixture was heated with a mantle heater to increase the temperature in the reaction system to 180° C. over approximately 20 minutes. The temperature in the reaction system was retained to 190° C. for 3 hours while the components distilled away were collected, and the stirring rotation number was adjusted depending on increase of the viscosity. After adding 104.9 g of N,N-dimethylacetamide thereto, the mixture was stirred at approximately 100° C. for approximately 2 hours to form a uniform solution, thereby providing a polyimide resin solution having a solution viscosity at a solid concentration of 20% by mass of 39.9 Pa·s (20% by weight) and a logarithmic viscosity described later of 1.22 dL/g.

As a result of analysis of the polyimide resin solution by $^1$H-NMR, the proportion of the constitutional unit derived from 2,2'-bis(trifluoromethyl)benzidine with respect to the total of the constitutional unit derived from 2,2'-dimethylbenzidine and the constitutional unit derived from 2,2'-bis(trifluoromethyl)benzidine in the resulting polyimide resin was 20% by mol. The disappearance of the peaks of the raw materials and the appearance of the peaks derived from the imide backbone were confirmed by FT-IR (Spectrum 100, produced by Perkin-Elmer Corporation).

The resulting polyimide resin solution was coated on a glass substrate, and the solvent was evaporated under conditions of 60° C. for 30 minutes and 100° C. for 1 hour to provide a self-supporting film. Thereafter, the self-supporting film was released from the glass substrate, the end of the film was fixed, and the solvent was removed by drying at 280° C. under a nitrogen atmosphere for 2 hours, so as to provide a polyimide film having a thickness of 65 μm.

The measurement of the polyimide film by NMR revealed that the structures derived from 1,2,3,4-cyclohexanetetracarboxylic anhydride included 71% by mol of the cis-structure and 29% by mol of the trans-structure.

Example 2

In the same 0.3 L five-neck round bottom glass flask as in Example 1, 20.15 g (0.095 mol) of 2,2'-dimethylbenzidine (produced by Wakayama Seika Kogyo Co., Ltd.), 7.60 g (0.024 mol) of 2,2'-bis(trifluoromethyl)benzidine (produced by Wakayama Seika Kogyo Co., Ltd.), 44.54 g of γ-butyrolactone (produced by Mitsubishi Chemical Corporation), and 5.99 g of triethylamine (produced by Kanto Chemical Co., Inc.) as a catalyst were stirred at 200 rpm under a nitrogen atmosphere at a temperature in the reaction system of 70° C., so as to provide a solution. 26.56 g (0.118 mol) of 1,2,4,5-cyclohexanetetracarboxylic dianhydride (produced by Mitsubishi Gas Chemical Co., Inc.) and 19.1 g of N,N-dimethylacetamide (produced by Mitsubishi Gas Chemical Co., Inc.) each were added at one time thereto, and the mixture was heated with a mantle heater to increase the temperature in the reaction system to 180° C. over approximately 20 minutes. The temperature in the reaction system was retained to 190° C. for 5.0 hours while the components distilled away were collected, and the stirring rotation number was adjusted depending on increase of the viscosity. After adding 136.4 g of N,N-dimethylacetamide thereto, the mixture was stirred at approximately 100° C. for approximately 3 hours to form a uniform solution, thereby providing a polyimide resin solution having a solution viscosity at a solid concentration of 20% by mass of 75.1 Pa·s and a logarithmic viscosity described later of 1.18 dL/g.

As a result of analysis of the polyimide resin solution by the same manner as in Example 1, the proportion of the constitutional unit derived from 2,2'-bis(trifluoromethyl)benzidine with respect to the total of the constitutional unit derived from 2,2'-dimethylbenzidine and the constitutional unit derived from 2,2'-bis(trifluoromethyl)benzidine in the resulting polyimide resin was 20% by mol. The disappearance of the peaks of the raw materials and the appearance of the peaks derived from the imide backbone were confirmed by FT-IR.

A polyimide film was produced with the polyimide resin solution in the same manner as in Example 1, and the polyimide film was measured by NMR. The NMR measurement revealed that the structures derived from 1,2,3,4-cyclohexanetetracarboxylic anhydride included 37% by mol of the cis-structure and 63% by mol of the trans-structure.

Example 3

In the same five-neck round bottom glass flask as in Example 1, 16.1 g (0.076 mol) of 2,2'-dimethylbenzidine (produced by Wakayama Seika Kogyo Co., Ltd.), 6.070 g (0.019 mol) of 2,2'-bis(trifluoromethyl)benzidine (produced by Wakayama Seika Kogyo Co., Ltd.), 25.45 g of γ-butyrolactone (produced by Mitsubishi Chemical Corporation), and 4.795 g of triethylamine (produced by Kanto Chemical Co., Inc.) as a catalyst were stirred at 200 rpm under a nitrogen atmosphere at a temperature in the reaction system of 70° C., so as to provide a solution. 21.25 g (0.095 mol) of 1,2,4,5-cyclohexanetetracarboxylic dianhydride (produced by Mitsubishi Gas Chemical Co., Inc.) and 25.45 g of N,N-dimethylacetamide (produced by Mitsubishi Gas Chemical Co., Inc.) each were added at one time thereto, and the mixture was heated with a mantle heater to increase the temperature in the reaction system to 180° C. over approximately 20 minutes. The temperature in the reaction system was retained to 180° C. for 5 hours while the components distilled away were collected, and the stirring rotation number was adjusted depending on increase of the viscosity, so as to provide a polyimide solution. Finally, after adding 83.3 g of N,N-dimethylacetamide and 25.8 g of γ-butyrolactone thereto, the mixture was stirred at approximately 100° C. for approximately 3 hours to form a uniform solution, thereby providing a polyimide resin solution having a solution viscosity at a solid concentration of 20% by mass of 100.0 Pa·s and a logarithmic viscosity described later of 1.23 dL/g.

As a result of analysis of the polyimide resin solution by the same manner as in Example 1, the proportion of the constitutional unit derived from 2,2'-bis(trifluoromethyl) benzidine with respect to the total of the constitutional unit derived from 2,2'-dimethylbenzidine and the constitutional unit derived from 2,2'-bis(trifluoromethyl)benzidine in the resulting polyimide resin was 20% by mol. The disappearance of the peaks of the raw materials and the appearance of the peaks derived from the imide backbone were confirmed by FT-IR.

A polyimide film was produced with the polyimide resin solution in the same manner as in Example 1, and the polyimide film was measured by NMR. The NMR measurement revealed that the structures derived from 1,2,3,4-cyclohexanetetracarboxylic anhydride included 41% by mol of the cis-structure and 59% by mol of the trans-structure.

The measurements were performed in the following manners.

Ratio of Cis-Structure and Trans-Structure ($^1$H-NMR Spectrum)

The $^1$H-NMR spectrum of the polyimide was measured in deuterated dimethylsulfoxide by using an NMR spectrophotometer, produced by Bruker Corporation (ASCEnd™ 500). The identifications of the protons were as follows.
$^1$H-NMR (DMSO-d$_6$)

δ 7.5 ppm to 8.0 ppm (trifluoromethylbenzidine aromatic protons, 6H)

δ 7.0 ppm to 7.5 ppm (2,2'dimethylbenzidine aromatic protons, 6H)

δ 3.2 ppm (trans-cyclohexanetetracarboxylic acid protons (1,2,4,5-positions), 4H)

δ 3.3 ppm (cis-cyclohexanetetracarboxylic acid protons (1,2,4,5-positions), 4H)

δ 2.2 ppm (trans-cyclohexanetetracarboxylic acid protons (3,6-positions), 4H)

δ 2.1 ppm, 2.3 ppm (cis-cyclohexanetetracarboxylic acid protons (3,6-positions), 4H)

δ 1.9 ppm to 2.1 ppm (2,2'-dimethylbenzidine methyl group protons, 6H)

The isomerization rate was calculated from the integrated values of the peaks derived from the cyclohexanetetracarboxylic acid moiety appearing at δ 2.2 ppm, 2.1 ppm, and 2.3 ppm according to the following expressions.

Proportion of trans-structure (% by mol)=2.2 ppm/ (2.2 ppm+2.3 ppm+2.1 ppm)

Proportion of cis-structure (% by mol)=100−proportion of trans-structure

Logarithmic Viscosity

A polyimide solution having a concentration of 0.5% by mass was measured at 30° C. with a Cannon-Fenske viscometer. A larger value of the logarithmic viscosity means a larger molecular weight. The solvent used for the solution was N-methylpyrrolidone.

Solution Viscosity

A polyimide solution having a solid concentration of 20% by mass (solvents: γ-butyrolactone and dimethylacetamide) was measured at 25° C. with a solution viscometer (TV-20), produced by Toki Sangyo Co., Ltd.). The cone rotor used was the standard.

As shown in Examples 1 and 2, the proportion of the trans-structure can be controlled by keeping the reaction temperature constant at 190° C. and changing the mass ratio of N,N-dimethylacetamide (which is an aprotic amide solvent) and γ-butyrolactone (which is a lactone solvent).

TABLE 1

| | Amounts of organic solvents in reaction (g) | | | Reaction temperature (° C.) | Reaction time (hour) | Solution viscosity (Pa · s (20% by weight)) | Logarithmic viscosity (dL/g) | cis-Structure (% by mol) | trans-Structure (% by mol) |
|---|---|---|---|---|---|---|---|---|---|
| | N,N-dimethyl-acetamide (a) | γ-butyro-lactone (b) | Mass ratio (a):(b) | | | | | | |
| Example 1 | 11.03 | 44.10 | 20:80 | 190 | 3 | 39.9 | 1.22 | 71 | 29 |
| Example 2 | 19.1 | 44.54 | 30:70 | 190 | 5 | 75.1 | 1.18 | 37 | 63 |
| Example 3 | 25.45 | 25.45 | 50:50 | 180 | 5 | 100.0 | 1.23 | 41 | 59 |

As shown in Example 3, in the case where the reaction temperature is 180° C., which is lower than 190° C., a proportion of the trans-structure equivalent to Example 2 can be obtained by increasing the proportion of N,N-dimethylacetamide.

The invention claimed is:

1. A method for producing polyimide, comprising:
reacting a diamine component and a carboxylic dianhydride component in an organic solvent containing an aprotic amide solvent and a lactone solvent, at a reaction temperature which is kept constant within a range of from 180° C. to 200° C., for a reaction time within a range of from 5 to 72 hours,
wherein the diamine component consists of 2,2'-dimethylbenzidine and 2,2'-bis(trifluoromethyl)benzidine, wherein the carboxylic dianhydride component consists of (1S,2R,4S,5R)-cyclohexanetetracarboxylic dianhydride, wherein the aprotic amide solvent is N,N-dimethylacetamide and the lactone solvent is γ-butyrolactone, and wherein the mass ratio of the aprotic amide solvent and the lactone solvent ((aprotic amide solvent):(lactone solvent)) is kept constant within a range of from 30:70 to 50:50, thereby producing a polyimide, wherein a cis-structure derived from the (1S,2R,4S,5R)-cyclohexanetetracarboxylic dianhydride is converted to a trans-structure derived from (1R,2S,4S,5R)-cyclohexanetetracarboxylic dianhydride in the formed polyimide, and wherein a solution viscosity of a 20% by mass solution of the polyimide in a solvent comprising γ-butyrolactone and N,N-dimethylacetamide measured at 25° C. is 75.1 Pa·s or more and 100.0 Pa·s or less, and a logarithmic viscosity of a 0.5% by mass solution of the polyimide in N-methyl-2-pyrrolidone measured at 30° C. using a Canon-Fenske viscometer is 1.18 dL/g or more and 1.23 dL/g or less.

2. The method for producing a polyimide according to claim 1, wherein a proportion of the cis-structure derived from the (1S,2R,4S,5R)-cyclohexanetetracarboxylic dianhydride which is converted to a trans-structure derived from (1R,2S,4S,5R)-cyclohexanetetracarboxylic dianhydride in the formed polyimide is 50 mol % or more.

3. The method for producing a polyimide according to claim 1, wherein a reaction temperature is kept constant within a range of from 190-200° C.

4. The method for producing a polyimide according to claim 1, wherein the amount of the aprotic amide solvent in the organic solvent is kept constant within a range of from 25-50% by mass.

5. The method for producing a polyimide according to claim 2, wherein a reaction temperature is kept constant within a range of from 190-200° C.

6. The method for producing a polyimide according to claim 2, wherein the amount of the aprotic amide solvent in the organic solvent is kept constant within a range of from 25-50% by mass.

* * * * *